United States Patent [19]

Toyoda et al.

[11] Patent Number: 4,903,539
[45] Date of Patent: Feb. 27, 1990

[54] DIRECT-DRIVE-TYPE MULTI-ARTICULATED ROBOT

[75] Inventors: Kenichi Toyoda, Hino; Nobutoshi Torii, Hachioji; Ryo Nihei, Musashino; Akihiro Terada, Hino; Jun Kikuchi, Hachioji, all of Japan

[73] Assignee: Fanuc Ltd., Yamanashi, Japan

[21] Appl. No.: 275,180

[22] PCT Filed: Jan. 28, 1988

[86] PCT No.: PCT/JP88/00070
§ 371 Date: Sep. 27, 1988
§ 102(e) Date: Sep. 27, 1988

[87] PCT Pub. No.: WO88/05713
PCT Pub. Date: Aug. 11, 1988

[30] Foreign Application Priority Data

Jan. 31, 1987 [JP] Japan .................. 62-19640

[51] Int. Cl.$^4$ .............................. B25J 3/04
[52] U.S. Cl. .................... 74/479; 310/67 R; 901/17; 901/23
[58] Field of Search ............. 74/479; 901/17, 23, 901/24; 310/67 R

[56] References Cited

U.S. PATENT DOCUMENTS

| | | | |
|---|---|---|---|
| 3,849,668 | 11/1974 | Dane | 901/23 X |
| 4,015,721 | 4/1977 | Scheler | 901/23 X |
| 4,425,818 | 1/1984 | Asada et al. | 901/23 X |
| 4,529,901 | 7/1985 | Bartell | 310/67 R X |
| 4,552,505 | 11/1985 | Gorman | 901/23 X |
| 4,606,695 | 8/1986 | Lenz | 901/23 X |
| 4,651,591 | 3/1987 | Wurst | 901/23 X |

FOREIGN PATENT DOCUMENTS 58-188191 12/1983 Japan .
59-196182 11/1984 Japan .
61-117691 7/1986 Japan .

Primary Examiner—Allan D. Herrmann
Attorney, Agent, or Firm—Armstrong, Nikaido, Marmelstein, Kubovcik & Murray

[57] ABSTRACT

A direct-drive-type multi-articulated robot comprising: a stationary support shaft (14), a cylindrical rotary casing (16) surrounding the stationary support shaft (14), a first robot arm (18) joined to the upper end (16a) of the rotary casing (16), a second robot arm (20) pivotally joined to the extremity of the first robot arm (18), a direct-drive motor (Mθ) interposed between the lower end of the rotary casing (16) and the lower end of the stationary support shaft (14) to drive the rotary casing (16) and the first robot arm (18) together for turning motion, a brake gear (24) interposed between the upper end (14a) of the stationary support shaft (14) and the first robot arm (18) to arrest the turning motion of the first robot arm (18), and an encoder (26) for detecting turning motion, interposed between the upper end (14a) of the stationary support shaft (14) and the first robot arm (18).

3 Claims, 2 Drawing Sheets

4,903,539

DIRECT-DRIVE-TYPE MULTI-ARTICULATED ROBOT

DESCRIPTION

1. TECHNICAL FIELD

The present invention relates to an industrial multi-articulated robot and, more particularly, to a motor disposing construction for application to a direct-drive-type multi-articulated robot.

2. BACKGROUND ART

Recently, an industrial robot having a direct-drive-type robot arm has been provided to improve the controllability of the multi-articulated robot. The direct-drive-type articulated robot is provided with a direct-drive motor as a drive motor at each junction of the robot components to drive the associated robot component for arm motions to improve the response characteristics through a reduction of frictional torque and inertia and to enhance the compactness of the robot body, by omitting the reduction gear and the trasmission. The universal utility of the direct-drive-type robot has progressively enhanced with an improvement of the performance of the direct-drive motor. Nevertheless, since it is conventional to incorporate a direct-drive motor serving as a drive source for a turning motion about the longitudinal axis relative to the robot base, namely, the turning motion of the first robot arm about the longitudinal axis, into the base and of the first robot arm, because the direct-drive-type robot is provided with a direct-drive motor at each junction, the direct-drive-type robot has structural disadvantages in that the external figure thereof is enlarged by a brake unit and encoders for detecting the angle of turning motion and turning speed, provided on the base end of the first robot arm in connection with the direct-drive motor, and that the range of turning motion of a second robot arm joined to the extremity of the first robot arm is limited by a part of the first robot arm in turning the second robot arm relative to the first robot arm through a large angle to locate the second robot arm at a desired position.

DISCLOSURE OF THE INVENTION

Accordingly, it is an object of the present invention to eliminate the disadvantages encountered by the industrial robot having the conventional direct-drive-type arm.

It is another object of the present invention to provide direct-drive-type multi-articulated robot having an increased degree of freedom of motion.

The present invention provides a direct-drive-type multi-articulated robot provided with, at least, a longitudinal stationary support shaft having an upper end and a lower end, a cylindrical rotary casing surrounding the stationary support shaft, a first robot arm joined to the upper end of the rotary casing, and a second robot arm joined to the extremity of the first robot arm; characterized by comprising a direct-drive motor means interposed between the lower end of the rotary casing and the lower end of the stationary support shaft to drive the rotary casing and the first robot arm together for turning motion, and break means interposed between the upper end of the stationary support shaft and the first robot arm to arrest the turning motion of the first robot arm. The direct-drive motor is separated from the junction of the rotary casing and the first robot arm and is disposed in the lower portion of the rotary casing so that the base end of the first robot arm forming the junction is formed in a compact form and shape and in a reduced size, and thereby a region of motion in the vicinity of the base end is expanded.

BRIEF DESCRIPTION OF THE DRAWINGS

The above and other objects, features and advantages of the present invention will become more apparent from the following description taken in conjunction with the accompanying drawings, wherein.

BEST MODE FOR CARRYING OUT THE INVENTION

Figure 1:
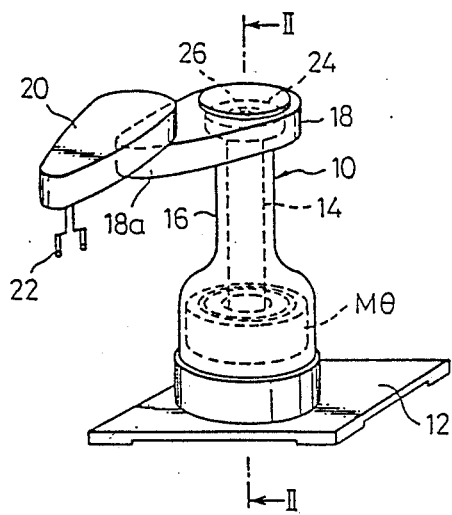
FIG. 1 is a schematic perspective view showing the essential construction of a direct-drive-type articulated robot in a preferred embodiment according to the present invention.
Figure 2:
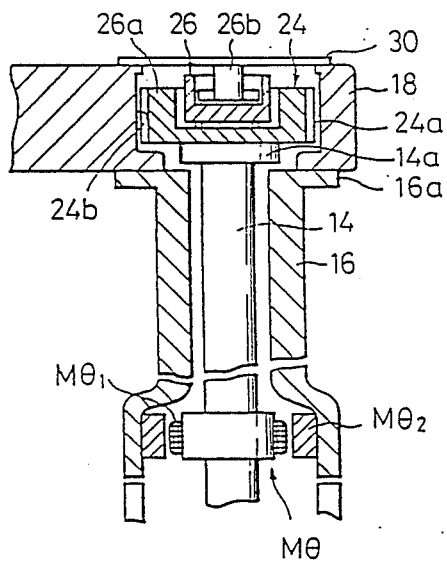
FIG. 2 is a longitudinal sectional view taken on line II—II in FIG. 1.

Referring to FIGS. 1 and 2, a direct-drive-type multi-articulated robot 10 embodying the present invention essentially comprises a fixed base 12, an elongate, stationary support shaft 14 set upright on the fixed base 12 at the center of the same, a rotary casing 16 coaxially receiving the stationary support shaft 14 therethrough, a first robot arm 18 joined to the upper end 16a of the rotary casing 16, a second robot arm 20 joined to the extremity 18a of the first robot arm 18, and a robot hand 22 attached to a robot wrist, not shown, provided on the extremity of the second robot arm 20. The upper end 14a of the stationary support shaft 14 set upright on the fixed base 12 extends into the interior of the first robot arm 18. The operating unit of a brake unit 24 is attached to the upper end 14a of the stationary support shaft 14, and an encoder 26 for detecting turning motion is provided coaxially with the brake unit 24 on the upper end 14a of the stationary support shaft 14. A direct-drive motor $M\theta$ for simultaneously turning the rotary casing 16 and the first robot arm 18 is disposed in a space between the stationary support shaft 14 and the rotary casing 16 at a position immediately above the fixed base 12. Another direct-drive motor, not shown, is provided at the junction of the first robot arm 18 and the second robot arm 20 to drive the second robot arm 20 for turning motion relative to the first robot arm 18.

Referring particularly to FIG. 2, the direct-drive motor $M\theta$ for simultaneously turning the rotary casing 16 and the robot arm 18 about the longitudinal axis has a stator assembly $M\theta_1$ fixedly mounted on the circumference of the stationary support shaft 14, and a rotor assembly $M\theta_2$ mounted on the inner circumference of the rotary casing 16. On the other hand, the brake unit 24 mounted on the upper end 14a of the stationary support shaft 14 has a brake shoe assembly 24a held on the stationary support shaft 14. The brake shoe assembly 24a is expanded and contracted to apply a braking force to and to remove the braking force from the inner circumference of the base end of the first robot arm 18 serving as a brake drum surface 24b. The encoder 26 for detecting turning motion has a detection signal generating unit 26a mounted coaxially with the brake shoe assembly 24a on the upper end 14a of the stationary support shaft 14, and a rotary unit 26b attached through a suitable flange plate 30 to the base end of the first robot arm 18 for turning together with the first robot arm 18.

The operation of the direct-drive-type multi-articulated robot embodying the present invention will be described hereinafter with reference to FIGS. 3A and 3B.

Figure 3A:
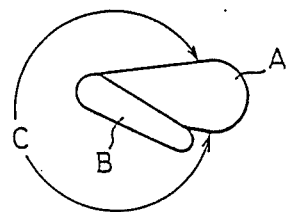
FIGS. 3A and 3B are plan views of assistance in explaining the functional difference between the conventional articulated robot and an articulated robot according to the present invention.
Figure 3B:
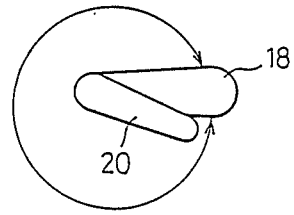

FIG. 3A is a view showing a conventional articulated robot having a direct-drive motor built in directly in the junction of the rotary casing and the first robot arm. The provision of the direct-drive motor in the junction expands the base end of the first robot arm A about the center of rotation in form and shape. Thus, the base end of the first robot arm A has a circular bulged shape having a comparatively large diametrical size. Consequently, the turning motion of the second robot arm B about the center of the rotation on the extremity of the first robot arm A is limited within an angular range indicated by an arrow C defined by positions where the second robot arm B comes into contact with the circular, bulged base end of the first robot arm A. That is, the angular range of turning motion of the second robot arm B is reduced considerably by the circular, bulged base end of the first robot arm A. Accordingly, the functional design must be made on the estimation of the possible turning motion of the second robot arm B within such a reduced angular range of turning motion, which is disadvantageous.

On the other hand, in the multi-articulated robot constructed according to the present invention as shown in FIGS. 1 and 2, the direct-drive motor $M\theta$ for turning motion about the longitudinal axis is separated from the junction of the rotary casing 16 and the first robot arm 18, and only the brake unit 24 and the encoder 26 are provided in the junction. Accordingly, the shape of the base end of the first robot arm 18 can be determined regardless of the external size of the motor, and thus the base end of the first robot arm 18 can be formed in a circular shape having a comparatively small diameter instead of a circular, bulged shape. Accordingly, the angular range of free turning motion of the second robot arm 20 is increased relative to that of the second robot arm of the conventional articulated robot, which enables the functional design of the robot on the basis of such an increased angular range of free turning motion and teaching practical actions. Thus, the utility of the robot work is expanded.

As is obvious from the foregoing description, according to the present invention, the direct-drive motor for driving the multi-articulated robot for turning motion about the longitudinal axis is provided in the lower portion of the rotary casing apart from the base end of the first robot arm instead of building in the direct-drive motor directly in the base end of the first robot arm as in the conventional practice. Accordingly, the angular range of the turning motion of the second robot arm pivotally joined to the extremity of the first robot arm is increased, and thereby the degree of freedom of motion of the multi-articulated robot is increased and the performance of the articulated robot is improved.

We claim:

1. A direct-drive-type multi-articulated robot comprising: an elongate stationary support shaft having an upper end and a lower end; a cylindrical rotary casing surrounding said stationary support shaft; a first robot arm joined to the upper end of said rotary casing; a second robot arm joined to an extremity of said first robot arm; a direct-drive motor means interposed between said lower end of said rotary casing and said lower end of said stationary support shaft to drive said rotary casing and said first robot arm together for turning motion and a brake means axially spaced from said motor and interposed to operate between said upper end of stationary support shaft and said first robot arm to arrest the turning motion of the first and said lower end of said stationary support shaft to drive said rotary casing and said first robot arm together for turning motion, and a brake means axially spaced from said motor and interposed to operate between said upper end of said stationary support shaft and said first robot arm to arrest the turning motion of the first robot arm.

2. A direct-drive-type multi-articulated robot according to claim 1, wherein an encoder for detecting turning motion is disposed coaxially with said brake means between said upper end of said stationary support shaft and said first robot arm.

3. A direct-drive-type articulated robot according to claim 1, wherein said direct-drive motor means includes a stator assembly attached to said stationary support shaft and a rotary assembly attached to the inner circumference of said cylindrical rotary casing around the stator assembly.

* * * * *